United States Patent
Sgaraglio et al.

(10) Patent No.: US 7,962,405 B2
(45) Date of Patent: Jun. 14, 2011

(54) MERCHANT ACTIVATION TRACKING SYSTEMS AND METHODS

(75) Inventors: Michael L. Sgaraglio, Massapequa Park, NY (US); Karin A. Erikson, Holbrook, NY (US); Edward J. Long, Jr., Port Jefferson Station, NY (US)

(73) Assignee: First Data Corporation, Greenwood Village, CO (US)

( * ) Notice: Subject to any disclaimer, the term of this patent is extended or adjusted under 35 U.S.C. 154(b) by 3405 days.

(21) Appl. No.: 10/108,934

(22) Filed: Mar. 27, 2002

(65) Prior Publication Data

US 2003/0187782 A1    Oct. 2, 2003

(51) Int. Cl.
*G06Q 40/00*    (2006.01)

(52) U.S. Cl. ........ 705/39; 705/10; 705/26; 705/38; 705/40; 707/4; 709/225; 726/7

(58) Field of Classification Search ............ 705/10, 705/26, 38, 40; 707/4; 709/225; 726/7
See application file for complete search history.

(56) References Cited

U.S. PATENT DOCUMENTS

| | | | |
|---|---|---|---|
| 5,383,113 A * | 1/1995 | Kight et al. .............. 705/40 |
| 5,611,052 A | 3/1997 | Dykstra et al. |
| 5,737,592 A * | 4/1998 | Nguyen et al. ............ 707/4 |
| 5,873,072 A * | 2/1999 | Kight et al. .............. 705/40 |
| 5,878,403 A | 3/1999 | DeFrancesco et al. |
| 5,940,811 A | 8/1999 | Norris |
| 5,941,947 A * | 8/1999 | Brown et al. ............ 709/225 |
| 5,960,407 A * | 9/1999 | Vivona .................... 705/10 |
| 6,058,380 A * | 5/2000 | Anderson et al. .......... 705/40 |
| 6,064,375 A * | 5/2000 | Velez et al. .............. 705/38 |
| 6,105,007 A | 8/2000 | Norris |
| 6,135,349 A | 10/2000 | Zirkel |
| 6,189,029 B1 | 2/2001 | Fuerst |
| 6,282,658 B2 * | 8/2001 | French et al. ............ 726/7 |
| 6,360,211 B1 * | 3/2002 | Anderson et al. .......... 705/40 |
| 6,405,181 B2 | 6/2002 | Lent et al. |
| 6,587,841 B1 | 7/2003 | DeFrancesco et al. |
| 7,103,570 B1 | 9/2006 | Morea et al. |
| 7,149,704 B2 | 12/2006 | Martin et al. |
| 7,181,427 B1 | 2/2007 | DeFrancesco et al. |
| 2001/0042021 A1 * | 11/2001 | Matsuo et al. ............ 705/26 |
| 2002/0026410 A1 * | 2/2002 | Woloshin et al. .......... 705/38 |
| 2003/0023555 A1 | 1/2003 | Rees |
| 2003/0187759 A1 | 10/2003 | Arthus et al. |
| 2003/0191714 A1 | 10/2003 | Norris |
| 2005/0038737 A1 | 2/2005 | Norris |

* cited by examiner

*Primary Examiner* — Ella Colbert
*Assistant Examiner* — Sanjeev Malhotra
(74) *Attorney, Agent, or Firm* — Kilpatrick Townsend & Stockton LLP

(57) ABSTRACT

A method for analyzing merchant account information comprises receiving at a server computer application information on merchants applying for credit service accounts. The application information is electronically stored at a storage location. At the server computer information is received from a user computer on how at least some of the accounts are being serviced. The servicing information is stored at the storage location.

10 Claims, 19 Drawing Sheets

MAE<sup>SM</sup> Search Criteria

- 60 (overall)
- 61 Reports
- 62 Security
- 63 POS Providers
- 64 (Print/Download toolbar area)
- 65 (form fields area)
- 66 Add New Home | Reports | Security | POS Providers First | Previous | Next | Last
Add New | Download | Print Merchant #
Legal Name | DBA Name
Address
City, State, Zip Quality Control Status:
MasterCard Merchant #:
MCC Code:
Total Risk:
Days Aging:
Status:
Product:
POS Provider (Primary):
Annual Credit Sales:
Business Phone: 111-222-3333
Federal Tax ID: 11-2222222
Sales Region:
Sales Channel:
Sales Person ID:

Credit Officer:
Credit Investigator:

Date Ranges
Received: ___ to ___
Pending: ___ to ___
Reviewed: ___ to ___
Approved: ___ to ___
Declined: ___ to ___
Voided: ___ to ___
AIS Setup: ___ to ___
SDF Approved: ___ to ___

FIG.5

MAE SM

Search

Enter General Information
INSTRUCTIONS: Please fill in the fields as completely as possible. Fields marked with a red asterisk ( * ) are required.

| Merchant | Quality Control | Visitation | Landlord | Bank References | Supplier References | Principals | Sales Data | Account Info | Card Types | Review | Risk | Dec |

Business Information

Merchant Number:
MasterCard Merchant Number:
* Business Name (DBA): a
* Business Legal Name:
* Business Address (P.O. Box NOT acceptable):
* City, State, Zip:
Business Phone: 111-222-3333
Customer Service Phone: 111-222-3333
* Business Type:
* Federal Tax ID: 11-2222222
Language Preference: English
* SDF (Same Day Funding) Requested?:
* Date Business Started: MM/DD/YYYY
* Date Contract Signed: MM/DD/YYYY
* Date of AIS Setup: MM/DD/YYYY
Date Welcome package: MM/DD/YYYY
Date MPA Imaged: MM/DD/YYYY
Date of POS Confirmation: MM/DD/YYYY
E-mail Address:
Web Site Address (URL):

MAE SM

Search

Enter Quality Control Information
INSTRUCTIONS: Please check the boxes that need further attention. — 78

| Merchant | Quality Control | Visitation | Landlord | Bank References | Supplier References | Principals | Sales Data | Account Info | Card Types | Review | Risk | Dec |

Quality Control Information

Business Name (DBA): a
Quality Control Status: Passed
Date of Quality Control: 11/28/01

Comments:

| Error codes | Error | Description |
|---|---|---|
| C01 | ☐ | Are the required signatures on the MPA? |
| C02 | ☐ | Is the MPA legible? |
| C03 | ☐ | Is the requestor name and Rep number written on the MPA? |
| C04 | ☐ | Is all required paper work submitted? |
| C06 | ☐ | Is Corp principle name (Owner) complete? |
| C07 | ☐ | Is Corp address complete? |
| C09 | ☐ | Is root number (if required) complete? |
| C10 | ☐ | Is Tax number complete - is box checked for Auto-retrieval? |
| C11 | ☐ | Is contact name complete? |
| C12 | ☐ | Is legal name complete? |
| C13 | ☐ | Is DBA name complete? |
| C14 | ☐ | Is SIC code complete? |

80
82

MAE SM

Search

Enter Visitation Information
INSTRUCTIONS: Please fill in the fields as completely as possible. Fields marked with a red asterisk ( * ) are required.

| Merchant | Quality Control | Visitation | Landlord | Bank References | Supplier References | Principals | Sales Data | Account Info | Card Types | Review | Risk | Dec |

Business Environment

Business Name (DBA): a

Inventory/Producer Line

* What does the business sell?:

External Facility

* Zone:
* Location: ▸    If Other
Vicinity/Condition: ▸
Seasons:
* Building Levels: ▸
* Building Condition: ▸
* Floor Occupied by Merchant: ▸    If Other
* Remaining Floors Occupied by: ▸
* Advertising Name Display: ▸

Internal Facility

* Condition of Equipment: ▸
* Merchandise Display: ▸
* Square Footage: ▸

Operation Environment

* Number of Registers: 0
* Number of Employees: 0
Leased: ▸
* Refund Policy: ▸

FIG. 8

MAE SM

Search

Enter Landlord Information
INSTRUCTIONS: Please fill in the fields as completely as possible. Fields marked with a red asterisk ( * ) are required. — 98

| Merchant | Quality Control | Visitation | Landlord | Bank References | Supplier References | Principals | Sales Data | Account Info | Card Types | Review | Risk | Dec |

Landlord Information

Business Name (DBA): a
* Merchant Owns Property?: [ ▶ ]
* Landlord:
* Landlord Contact (Last Name, First Name):
* Address:
* City, State, Zip: [ ], [ ▶ ]
* Phone: 111-222-3333 ← 102

Back

Next

© 2002 First Data Merchant Services Corporation. All Rights Reserved.
All trademarks, service marks and trade names referenced
on this site are the property of their respective owners.

MAE SM

Search

Enter Bank Reference Information
INSTRUCTIONS: Please fill in the fields as completely as possible. Fields marked with a red asterisk ( * ) are required. — 108

| Merchant | Quality Control | Visitation | Landlord | Bank References | Supplier References | Principals | Sales Data | Account Info | Card Types | Review | Risk | Dec |

Bank Reference Information

Business Name (DBA): a
* Bank Name:
Bank Contact (Last Name, First Name):
* Address:
* City, State, Zip: ,
Phone: 111-222-3333
* Account #: — 112

Back                                                                Next

© 2002 First Data Merchant Services Corporation. All Rights Reserved.
All trademarks, service marks and trade names referenced
on this site are the property of their respective owners.

MAE SM

Search

Enter Supplier Reference Information
INSTRUCTIONS: Please fill in the fields as completely as possible. Fields marked with a red asterisk ( * ) are required.

Merchant | Quality Control | Visitation | Landlord | Bank References | Supplier References | Principals | Sales Data | Account Info | Card Types | Review | Risk | Dec Supplier Reference Information Business Name (DBA): a

Supplier #1
* Supplier Name:
* Supplier Contact (Last Name, First Name):
* Address:
* City, State, Zip:
* Phone: 111-222-3333
* Supplier Product/Service:

Supplier #2
Supplier Name:
Supplier Contact (Last Name, First Name):
Address:
City, State, Zip:
Phone: 111-222-3333
Supplier Product/Service:

Supplier #3
Supplier Name:
Supplier Contact (Last Name, First Name):
Address:
City, State, Zip:

MAE SM

Search

Enter Sales Information
INSTRUCTIONS: Please fill in the fields as completely as possible. Fields marked with a red asterisk (*) are required.

Merchant | Quality Control | Visitation | Landlord | Bank References | Supplier References | Principals | Sales Data | Account Info | Card Types | Review | Risk | Dec

140

142

Sales Data

Business Name (DBA): a
Product:
* MCC Code: 742-VETERINARY SERVICES
* Total Annual Sales of Business (in thousands): $0 ,000
* Total Annual Credit Card Sales (in thousands): $0 ,000
* Average Credit Card Transaction: $0
Discount Rate: 0 %

144

Business Procedures

* What % of your Credit Card Payments are from: 0 % Internet
0 % Mail order/Telephone order
0 % In store
100% TOTAL

* Products/Services are delivered in: 0 % 0-7 days
0 % 8-14 days
0 % 15-30 days
0 % 31+ days
100% TOTAL Back                                                                Next

FIG. 14

MAE SM

Search

Reprint Authorization Sheet    Reprint Keying Sheet
Enter New Account Information
INSTRUCTIONS: Please fill in the fields as completely as possible. Fields marked with a red asterisk ( * ) are required.

| Merchant | Quality Control | Visitation | Landlord | Bank References | Supplier References | Principals | Sales Data | Account Info | Card Types | Review | Risk | Dec |

Business Information

* Legal Name:
*Business Name (DBA): a
* DBA Address:
* DBA City, State, Zip:
Corp Address:
Corp City, State, Zip:
Risk Level:
* System:
* Prin:
* Phone: 111-222-3333
* Contact (Last Name, First Name):
* Federal Tax ID: 11-2222222
* Sales Responsibility:
* Assessment Code: 01-Regular
County Code:
* Deposit Type: 3-ETC
* Chain Code:
* Merchant Type: REGULAR
* ETC Type: 1-Early
* ETC Cutoff:

FIG.15

MAE SM

Search

Your application has not been completed.
The following is the list of reasons:

| Merchant | Quality Control | Visitation | Landlord | Bank References | Supplier References | Principals | Sales Data | Account Info | Card Types | Review | Risk | Dec |

Review Application

Business Name (DBA): a

Business Information

| Field | Value | Reason |
|---|---|---|
| Legal Name | | Missing field |
| Address | | Missing field |
| City | | Missing field |
| State | | Missing field |
| Zip Code | | Missing field |
| Business Phone | | Missing field |
| Federal Tax ID | | Missing field |
| Date Business Started | | Missing field |
| Date Contract Signed | | Missing field |
| Business Type | | Missing field |
| SDF Requested | | Missing field |

Business Environment

| Field | Value | Reason |
|---|---|---|
| Product/Service | | Missing field |
| Zone | | Missing field |
| Location | | Missing field |
| Building Levels | | Missing field |
| Building Condition | | Missing field |
| Floor Occupied by Merchant | | Missing field |

FIG.16

MAE SM

[Search]

Enter Risk Calculation Information
INSTRUCTIONS: Please fill in the fields as completely as possible. Fields marked with a red asterisk ( * ) are required.

| Merchant | Quality Control | Visitation | Landlord | Bank References | Supplier References | Principals | Sales Data | Account Info | Card Types | Review | Risk | Dec |

Review Application

Business Name (DBA): a
Product:
MCC Code: 742-VETERINARY SERVICES
Total Annual Sales of Business: $0 ,000
Total Annual Credit Card Sales: $0 ,000
Average Credit Card Transaction: $0
Discount Rate: 0 %
Estimated Annual Revenue: $0

Risk Data

CR Timeliness: 10
NDX Days: 0

CB Ratio: 0.00101
CR Ratio: 0.00586
NDX Percent: 0 %

CB Risk: $0
CR Risk: $0
Normal Risk: $0
NDX Risk: $0
Other Risk: $0
Total Risk: $0

[Back]   [Save]

© 2002 First Data Merchant Services Corporation. All Rights Reserved.
All trademarks, service marks and trade names referenced on this site are the property of their respective owners.

| | |
|---|---|
| Business | |
| Business Name (DBA): | Calgary Freightliner Ltd. |
| Principal Contact: | Nygard, Stacey |
| Business Phone: | 4035694800 |
| First Data Merchant ID: | 98867410011 |
| MasterCard Merchant ID: | 10100949 |
| Voice Authorization ID: | 86741 |
| Saleperson | |
| Salesperson ID: | 10334 |
| Sales Region: | Regional |
| Primary Bank | |
| Primary Bank (POS Provider): | TD/Existing |
| Contact: | |
| Phone: | |
| Welcome Kit | |
| Has merchant received Welcome Kit? : | ☐ |
| Date Welcome Kit Received: | MM/DD/YYYY |
| Has merchant contacted Primary Bank? : | ☐ |
| Date Primary Bank Contacted: | MM/DD/YYYY |
| If No, what was the reason? : | |
| Primary Confirmation | |
| Has primary bank spoken to the merchant? : | ☐ |
| Does primary bank have all necessary information to process the switch? : | ☐ |
| Date of primary bank confirmation: | MM/DD/YYYY |
| If No, what was the reason? : | |
| Primary Sign Off Confirmation | |
| Has FDLCC received confirmation that the account will be switched? : | ☐ |
| Date of primary bank sign off confirmation: | MM/DD/YYYY |
| If No, what was the reason? : | |
| Comments | |

FIG. 19

MERCHANT ACTIVATION TRACKING SYSTEMS AND METHODS

CROSS REFERENCES TO RELATED APPLICATIONS

This application is related to commonly assigned and concurrently filed U.S. patent application Ser. No. 10/108,781, entitled "DECISION TREE SYSTEMS AND METHODS", by Mark G. Arthus, et al., and to commonly assigned and concurrently filed U.S. patent application Ser. No. 10/108,575, entitled "SYSTEMS AND METHODS FOR MONITORING CREDIT RISK", by Michael L. Sgaraglio, and to commonly assigned and concurrently filed U.S. patent application Ser. No. 10/109,198, entitled "MERCHANT APPLICATION AND UNDERWRITING SYSTEMS AND METHODS", by Michael L. Sgaraglio, et al., and to commonly assigned and concurrently filed U.S. patent application Ser. No. 10/108,785, entitled "SYSTEMS AND METHODS FOR MANAGING COLLECTIONS RELATING TO MERCHANT ACCOUNTS", by Mark G. Arthus, et al., and to commonly assigned and concurrently filed U.S. patent application Ser. No. 10/108,948, entitled "SYSTEMS AND METHODS TO MONITOR CREDIT FRAUD", by Mark G. Arthus, et al., which applications are incorporated herein by reference in their entirety for all purposes.

BACKGROUND OF THE INVENTION

This invention relates generally to the field of financial transactions, and in particular to the establishment of credit services between merchants and credit service providers. More specifically, in one specific aspect the invention relates to the establishment of merchant accounts with credit card transaction processing entities.

Financial transactions involving the use of presentation instruments, such as credit cards, play an important role in today's economy. A typical credit card transaction proceeds by extracting account information from the credit card, typically using a point of sale device at a merchant location, and submitting the account information along with a requested payment amount to a processing system. Such a processing system may involve the merchant's bank, a credit card association, such as VISA or MasterCard, and the issuer's bank as is known in the art.

Hence, in order to process a credit card transaction, a merchant must typically establish an account with a processing organization. Because the processing organization takes on certain financial risks when agreeing to process a merchant's transactions, an application and underwriting process typically takes place before an account is opened. For example, an account may be established by first requiring the merchant to fill out a credit application. The credit application is then sent to an underwriter who reviews information in the application to determine whether the merchant would be a suitable client. If so, the account is established, and the merchant may begin accepting at least certain types of credit cards as payment for their goods or services.

Currently, much of the application and underwriting process may be both manual and paper intensive. As such, the process for opening an account may be inefficient and time consuming. Further, inconsistent decisions on the suitability of a given merchant may vary from underwriter to underwriter. Still further, such a system suffers from being unable to suitably monitor the effectiveness of the sales force gathering the application information.

Hence, this invention is related to ways to improve the merchant account initiation and underwriting process. The invention is also related to ways to track such accounts, once established.

BRIEF SUMMARY OF THE INVENTION

The invention provides various methods for establishing credit services with merchants, and to evaluate how accounts are being serviced. The methods may conveniently be implemented over a computer network, such as the Internet, and may use hardware and software that are configured to operate in a network environment as is known in the art. For example, the invention may employ one or more server computers that access one or more data storage devices, such as databases, to store and process the information. Essentially any type of computer that may communicate over a network may be used to access and display this information as is known in the art.

In one exemplary embodiment, credit services with a merchant may be established by receiving at a server computer application information on a merchant applying for a credit service, and storing the application information in a database. To underwrite the account, a credit investigator may send a request to the server computer to view at least some of the application information. Upon receipt of the request, the requested information is sent to the credit investigator from the server computer. Hence, the application and underwriting process may all occur in a web based environment to provide easy and convenient access to the application information. Further, the application information may be stored in electronic form, thereby eliminating the need for paper files, and providing for easy and convenient access to historical data.

Upon review of the application information, the credit investigator may send various underwriting information to the server computer. For example, if all is in order, the investigator may send an approval to establish credit services. To assist in the underwriting process, the server computer may calculate credit risk information based on the application information, and send the credit risk information to the credit investigator. In one aspect, the credit investigator may change certain parameters used in the risk calculations, and then have the server computer recalculate the risk information. In this way, the credit investigator may evaluate various "what-if" type scenarios based on modified financial information.

In another aspect, the method provides a review feature to evaluate whether all required application information has been transmitted to the server computer. Based on such a request, the server computer may send a document containing the list of application information that has not been received. Such application information may be classified into various categories, such as merchant information, visitation information, landlord information, bank references, supplier references, principal references, sales information, account information, and the like.

In still another aspect, the application information may be input by sending an application information form from the server computer to an application computer. The application form is displayed on the application computer and includes various fields for entering the application information using an entry device. In this way, the application information may easily be input and stored in the database for use by the underwriter. Conveniently, the application form may be displayed in tabular form on the application computer. In this way, selection of each tab causes the server computer to render a more specific application form on the application computer.

Various security features may also be provided. For example, authentication information may be required from the credit investigator before being able to view the application information. Further, those inputting the application information may be prevented from accessing credit risk and underwriting evaluation information.

In one particular aspect, the method may be used to facilitate servicing of an account. For example, for each merchant record, information may be sent to the server computer on how the account is being serviced. Conveniently, this information may be elicited by displaying data fields on the user's computer and requesting the user to enter the data showing how the accounts are being serviced. This information may then be stored at the server and various reports may be generated showing how the account is being serviced. For instance, reports may be generated showing whether an account has actually been activated, approval rates for the accounts, accounts that have been declined and void, and the like. Also, a variety of aging reports may be generated to show the time required to perform each step of the servicing process.

The server computer may be configured to identify certain groups of merchants as requested by a user and to generate a document containing information needed to generate letters to such merchants. For example, the server computer may be used to identify merchants having certain common business practices so that a marketing mailer may be sent to such merchants. As another example, merchants may be identified that need to receive a welcome letter after signing up for a service.

Once the account is opened, the server computer may also send configuration information to a financial transaction system for configuration of a merchant account. In this way, once a merchant accepts a credit card as payment, a back end system may be properly configured to process the transaction.

BRIEF DESCRIPTION OF THE DRAWINGS

FIG. 5 illustrates one embodiment of a search page rendered on a display screen according to the invention.

FIG. 6 illustrates one embodiment of a merchant business information page rendered on a display screen according to the invention.

FIG. 7 illustrates one embodiment of a quality control information page rendered on a display screen according to the invention.

FIG. 8 illustrates one embodiment of a visitation information page rendered on a display screen according to the invention.

FIG. 9 illustrates one embodiment of a landlord information page rendered on a display screen according to the invention.

FIG. 10 illustrates one embodiment of a bank reference information page rendered on a display screen according to the invention.

FIG. 11 illustrates one embodiment of a supplier reference information page rendered on a display screen according to the invention.

FIG. 12 illustrates one embodiment of a principal signer information page rendered on a display screen according to the invention.

FIG. 13 illustrates one embodiment of a sales date information page rendered on a display screen according to the invention.

FIG. 14 illustrates one embodiment of a new account information page rendered on a display screen according to the invention.

FIG. 15 illustrates one embodiment of a card type information page rendered on a display screen according to the invention.

FIG. 16 illustrates one embodiment of a review application page rendered on a display screen according to the invention.

FIG. 17 illustrates one embodiment of a risk analysis page rendered on a display screen according to the invention.

FIG. 18 illustrates one embodiment of a decision information page rendered on a display screen according to the invention.

FIG. 19 illustrates one embodiment of an account activation tracking page rendered on a display screen according to the invention.

DETAILED DESCRIPTION OF THE INVENTION

Figure 1:
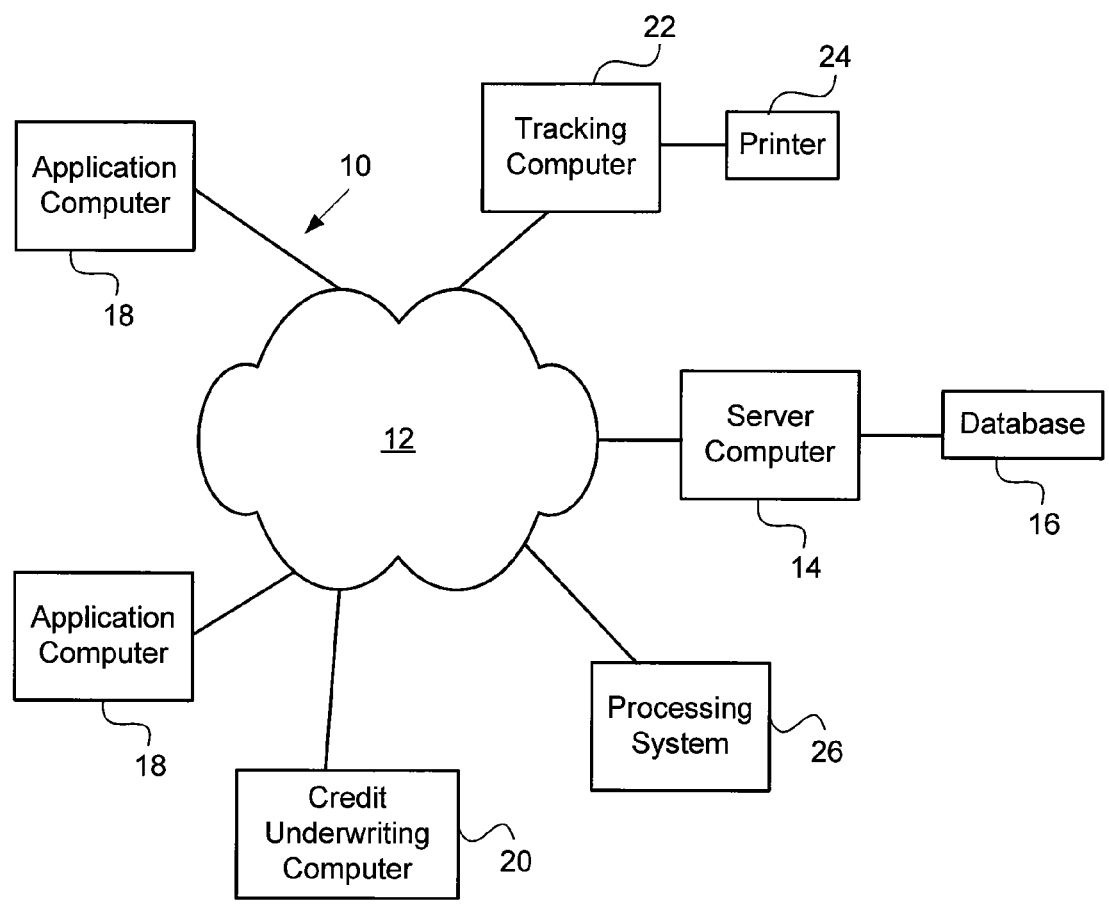
FIG. 1 is a schematic diagram of a system for establishing credit services with merchants according to the invention.

The invention provides various systems and methods for establishing credit services. Such credit services may be established with essentially any type of person, entity, organization, business, or the like that wishes to take payments for goods or services in the form of a credit, and, for convenience of discussion, are generally referred to herein as "merchants". Such merchants may process a credit transaction based on an account identifier presented at the time of payment. The account identifier is used to identify the account to which the credit will eventually be posted. In many cases, the account identifier is provided on some type of presentation instrument, such as credit card, debit card, smart card, stored value card, or the like. Conveniently, the account identifier may be read from a point of sale device, such as those described in copending U.S. application Nos. U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference. However, the account identifier may be obtained in other ways, such as by visual inspection of the presentation instrument, by telephone, over the Internet, and the like.

The user account information is transmitted to a credit processing service that approves and processes the transaction information and provides payment to the merchant. As is known in the art, various other organizations may also participate in the transaction in order to bill the user for the transaction, including the issuing bank, the merchant's bank, a credit card association, and the like. The credit processing service may also handle "charge backs", e.g. when the card holder requests a refund and the account is credited. One example of a credit processing service is the service provided by First Data Corporation, Greenwood Village, Colo.

The invention provides various techniques and systems to facilitate the gathering of merchant information associated with an application by the merchant for credit services. For example, such application information may be entered into a computer and transmitted to central computer over a network. The information may be transmitted over a wide variety of networks, such as the Internet, wide area networks, local area networks, wireless networks, and the like. Conveniently, the techniques may be implemented using one or more server computers and associated databases. Examples of servers and databases that may be used include a DELL 4700 server and a MS FoxPro database.

Essentially any type of computer that may communicate over a network may be used to implement the invention. For example, such computers may include traditional personal computers, personal digital assistants, and the like. Such computers may include a processing system, interfaces, and appropriate software to display documents transmitted over a network, such as internet browser software.

To underwrite an application, a credit investigator or credit officer may electronically access the application information. In one feature of the invention, the server computer may be configured to assign investigation of the applications between a group of investigators such that the workload between the investigators remains about the same. For example, as the applications are received, the server computer may assign them to investigators having a smaller number of applications in the investigation que. The server computer may monitor the queues to ensure that the workload is generally evenly balanced between the investigators.

In another feature, the invention may perform various credit risk calculations to facilitate the underwriting process. These calculations may be intuitive risk models that are based on industry risk standards, or may be customized risk models. In another feature, the invention may require the investigator to consider various information before approval of the application. Conveniently, such a process may utilize a decision tree to ensure each application is underwritten in a thorough and consistent manner. Examples of decision trees that may be used are described in copending U.S. application Ser. No. 10/108,781, entitled "DECISION TREE SYSTEMS AND METHODS", filed on the same date as the present application, the disclosure of which is herein incorporated by reference.

Once the application is approved, configuration information may be electronically sent to the credit processing system so that the merchant may begin making transactions. Merely by way of example, regular batch updates may be sent to various credit processing computers, such as those used by First Data Resources, Omaha, Nebr.

The invention may be used to follow up on how the account is being serviced, including whether there have been any merchant contacts, whether the necessary logistical measures have been taken, whether the service has actually been activated, and the like. Conveniently, this information may be elicited over a network by generating a form that is displayed on the user's computer. This form may have various data fields that need to be completed in order to complete servicing of the account. The form may conveniently be ordered according to how the servicing agent should be servicing the account. For instance, the form may ask whether a welcome letter was sent, whether a welcome kit was received, whether the primary bank has been contacted, and the like. The input data is stored electronically so that various reports may be generated to summarize the servicing and usage activity. Such reports may be static (pre-defined) or ad hoc as requested by the user. Further, the reports may be supplied to the user in a variety of formats to permit easy printing, visualization and/or manipulation of the data in the reports.

Another feature is that the server computer may be used to identify groups of merchants that may be contacted for certain reasons, such as for direct mailings, for targeted advertising and the like. Further, once identified, the server computer may send information back to a user computer with the information to be supplied to the merchant. For example, the server computer may generate welcome letters that are sent to the user's computer.

Referring now to FIG. 1, one embodiment of a system 10 that may be used to establish credit services will be described. In so doing, it will be appreciated that other arrangements may be used, and the invention is not intended to be limited to only the system shown in FIG. 1. System 10 transmits data using a network 12, such as the Internet. A server computer 14 having an associated database 16 is connected to network 12. Residing on server computer 14 are various applications that permit electronic documents to be transmitted and received over network 12. For example, server computer 14 may transmit web pages to various application computers 18 to elicit merchant application information needed to establish new accounts. The information transmitted back from application computers 18 may be stored in database 16 so that historical records may be electronically maintained.

Also coupled to network 12 is one or more credit underwriting computers 20 that may be used to access the application information stored in database 16. Further, server computer 14 may be used to calculate various credit risks based on the information in the application. This information may also be transmitted to underwriting computer 20 for visualization by the underwriting. Further, the data used for the calculations may be modified at underwriting computer 20 so that server computer 14 may generate revised risk calculations based on the modified data.

One or more tracking computers 22 may also be coupled to network 12 to facilitate servicing of a new account. For example, server computer 14 may generate and send a welcome letter to tracking computer 22. This may be printed using a printer 24 and then sent to the new merchant. Server computer 14 may also generate a wide variety of reports on how the account is being serviced or used by the merchant. This may be viewed using tracking computer 22 and also printed at printer 24.

Once an account is approved, configuration information may be sent from server computer 14 to a credit processing system computer 26. This configuration information is used to correlate transactions with a given merchant, and the merchant's bank so that proper processing may occur. Processing system computer 26 may be a main frame type computer that receives an processes credit card transactions from a wide variety of merchants as is known in the art.

Figure 2:
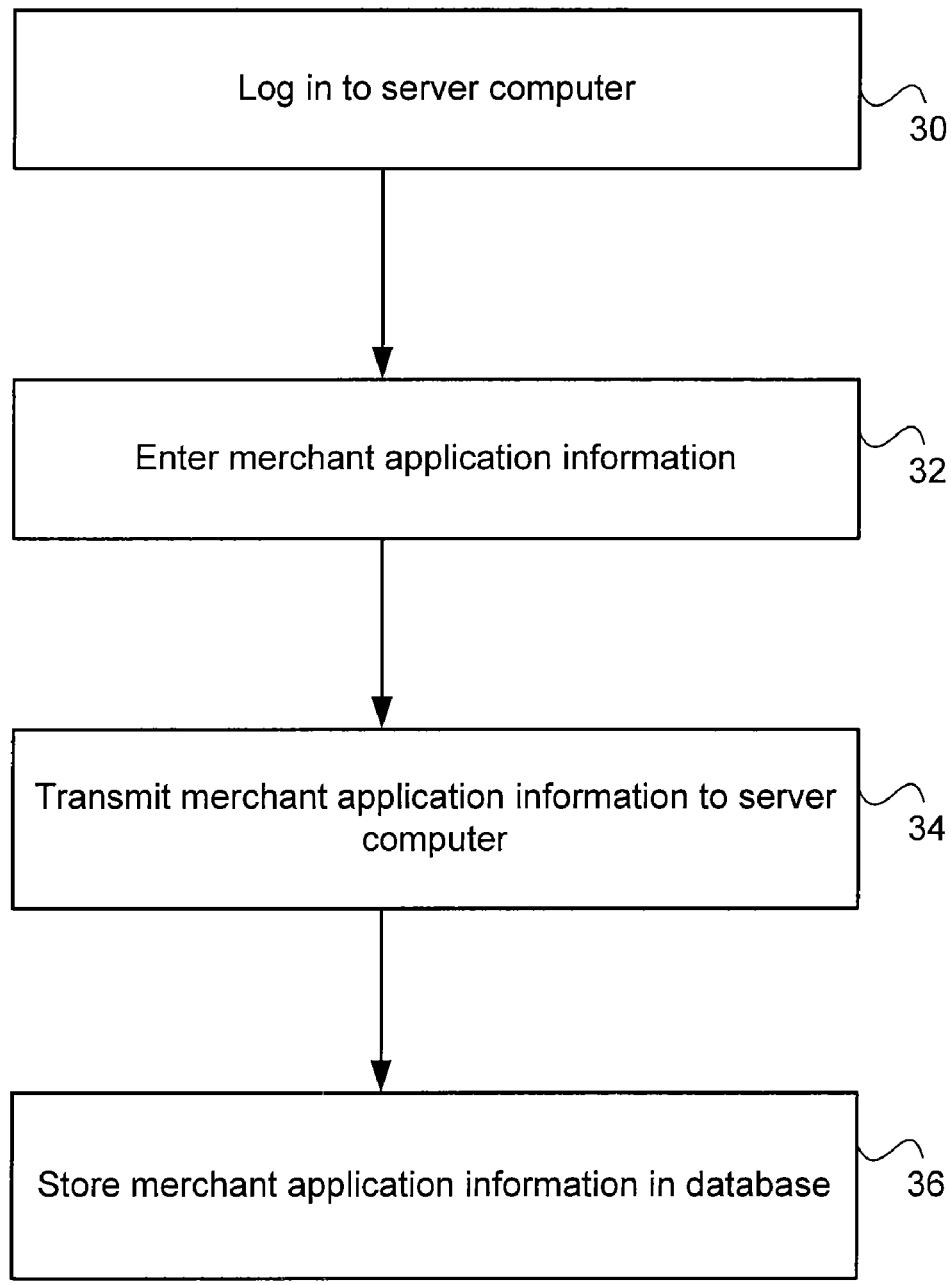
FIG. 2 is a flow chart illustrating one method for entering merchant application information according to the invention.

FIG. 2 is a flow chart illustrating one method for gathering and storing merchant application information when applying for credit services. Initially, the user logs into his or her application computer as illustrated in step 30. Conveniently, user name and password information may be required before login will be permitted. Once successfully logged in, the user may be provided with an application form that is displayed on the display screen. The user may drill down to obtain more specific information by selecting various icons or tabs displayed on the display screen. Conveniently, the application may include various data fields that are labeled where the application information may be entered using conventional data entry devices, such as keyboards, pointing devices, and the like. In some cases, the user may be required to enter into certain fields before proceeding to other fields, or some fields may simply be marked as required fields. As one option, the user may be provided with information that a field was entered incorrectly, or not at all, so that this data may be corrected or entered before proceeding to the next part of the process. At step 32, the merchant application information is entered into the form and is then transmitted over the network to the server computer as shown in step 34. The server computer in turns stores the merchant application information in a database as illustrated in step 36.

In this way, the merchant application information may be stored electronically at a central location. Hence, anyone needing access to the application information may visualize the information simply logging into the server computer. By computerizing the application information, safeguards may be put in place to ensure that all necessary information is submitted. For example, if certain critical data fields are not entered, a flag or other indication may be presented to the user requesting that this information be submitted. Similar flags may also be presented if the data is not in the correct format. In this manner, a complete electronic record may be created for each merchant applying for credit services. By storing the file electronically, the data may be more easily accessed and the chances for losing loose paperwork in a paper file is eliminated.

Figure 3:
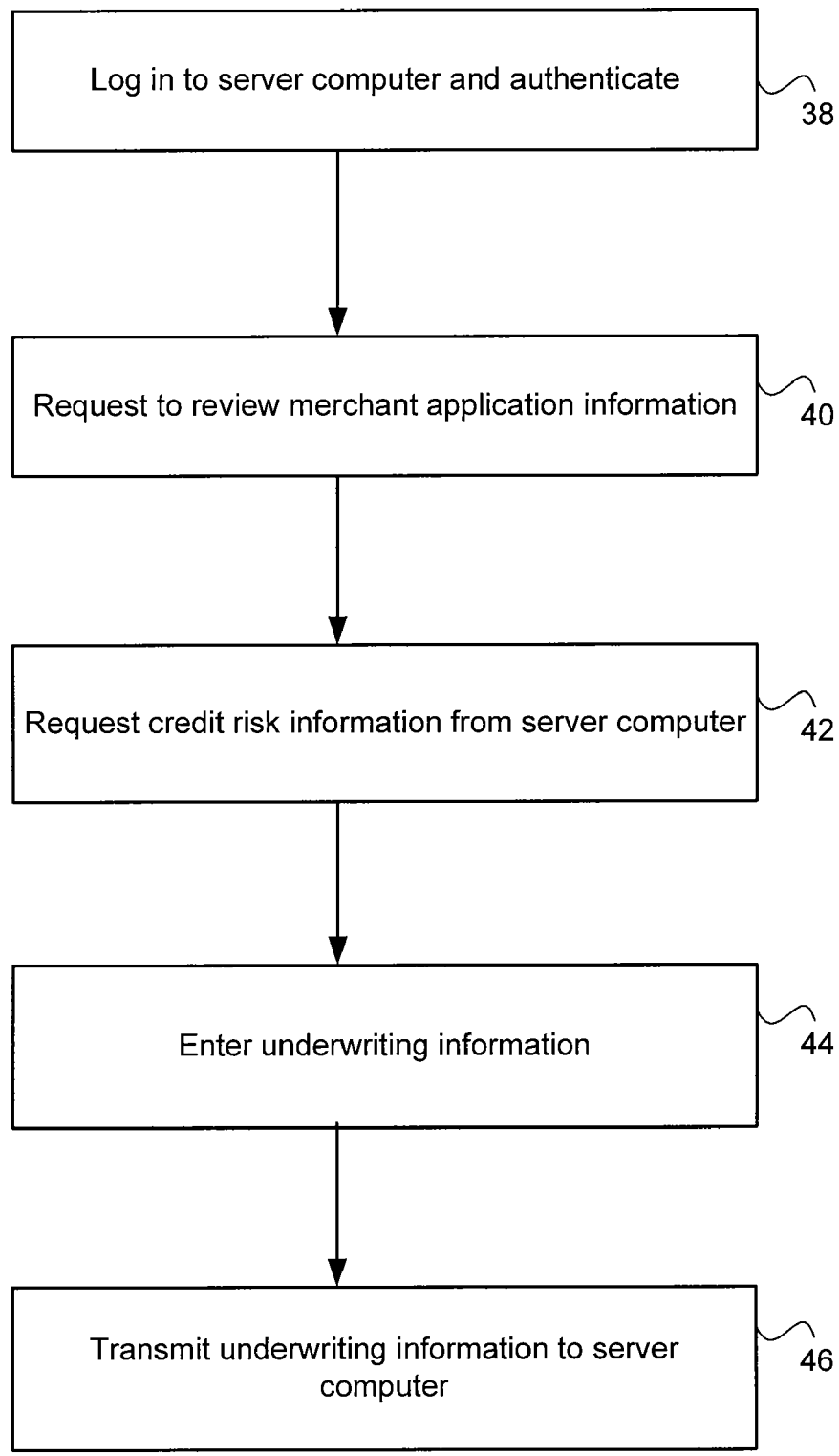
FIG. 3 is a flow chart illustrating one method for underwriting a merchant application according to the invention.

FIG. 3 illustrates a method for underwriting a merchant application that has previously been stored in a database. In step 38, the underwriter logs into his or her computer, typically entering a user name and password. An authentication process may be invoked to ensure that the underwriter has authorization to access the merchant application information. When successfully logged in, the underwriter may request to review the merchant application information as shown in step 40. Conveniently, the underwriter may perform a simple search to locate a desired application. Upon receipt of the request, the server computer may send the information to the underwriter's computer which may then be displayed on the display screen.

As shown in step 42, the underwriter may also request credit risk information relating to the merchant. This request is transmitted to the server computer that may perform one or more credit risk evaluations based on the information in the application. The evaluations may be based on industry standard risk models as well as customized risk models. This credit risk information is then transmitted back to the underwriter's computer for evaluation. In some cases, the credit investigator may wish to perform various "what if" scenarios by varying the parameters used in the risk calculations to determine how the calculations will vary. For example, the credit investigator may desire to evaluate the changes in risk if the merchant's sales increase or decrease, if the merchant's time to deliver the goods or services increases or decreases, or the like. The changes are submitted to the server computer for recalculation of the credit risks. This information is then transmitted back to the underwriter's computer.

The credit investigator may also be provided with a list of various questions that the credit underwriter should answer before giving a final decision. These questions may optionally be presented in a decision tree form as described in copending U.S. application Ser. No. 10/408,781, entitled "DECISION TREE SYSTEMS AND METHODS", filed on the same date as the present application, and incorporated herein by reference. In this way, each account is processed in the same manner to assure uniformity in the evaluation process. Once the underwriter has made his or her decision, the underwriter information is entered and transmitted back to the server computer as illustrated in steps 44 and 46. This information is then stored in the database. Further, account configuration information may be transmitted to a credit processing system so that the backend processing system may be configured to handle credit card transactions from the merchant.

Hence, the invention provides a way for a credit investigator to easily and conveniently underwrite an account by simply accessing an electronic file that was previously created and stored in a database. Once the underwriter has made the decision, this information may be transmitted back to a server computer and stored in the database so that the account may be activated and serviced.

Figure 4:
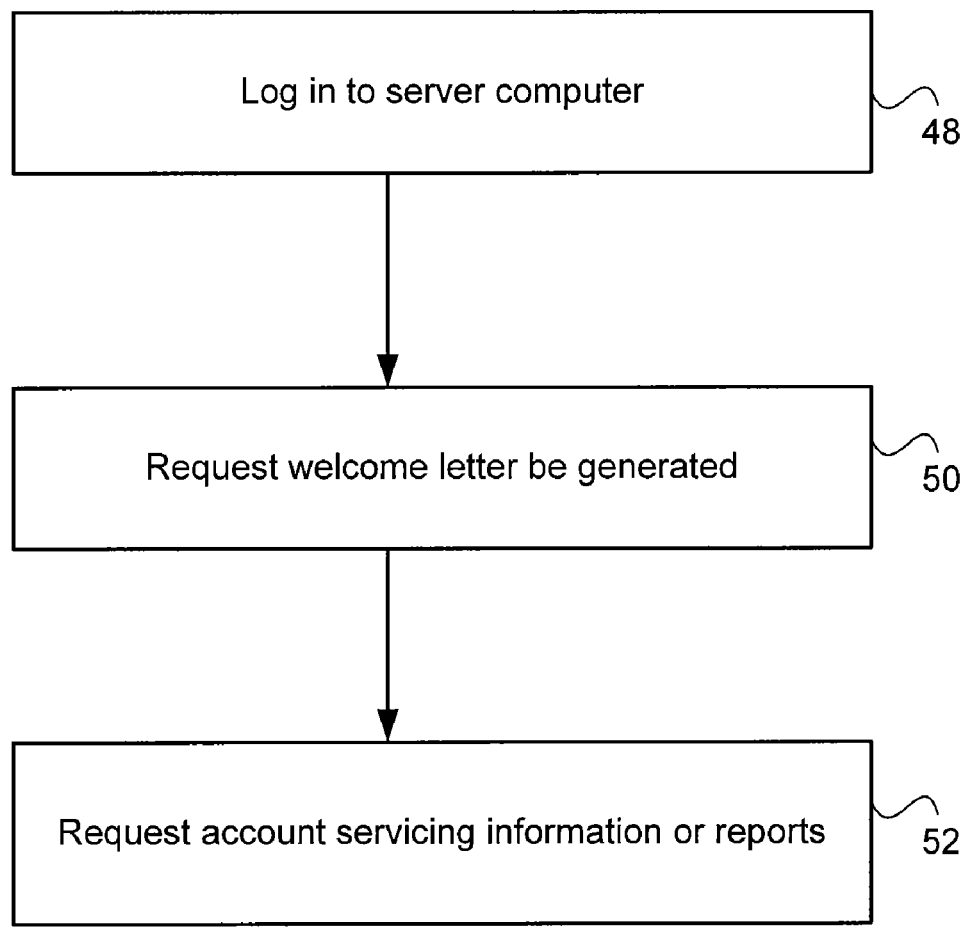
FIG. 4 is a flow chart illustrating a method for servicing an activated merchant account according to the invention.

FIG. 4 illustrates a method for servicing an approved merchant account. As shown in step 48, a servicing agent may initially log in to gain access to the server computer. Depending on the level of security authorization, the service representative may access various information on the account. Further, as shown in step 50 the service agent may request the generation of a welcome letter to the merchant. This letter may be transmitted back to the service representative's computer and printed out and then mailed or faxed to the new merchant. Optionally, the service agent may request the generation of other types of letters as well. For example, a letter may be requested that contains marketing information directed toward a certain group of merchants. As shown in step 52, various other types of account servicing information may be requested. For example, the service representative may evaluate whether the merchant has received training, proper equipment, such as a point of sale device, and the like. Also, information may be provided as to whether the account is currently being used. Further various static or ad hoc reports may be generated to show this type of information in summary form for one or more merchants.

The servicing information may be entered into the server computer by a service representative each time the account is serviced. For example, if a service representative has visited the merchant and provided training, this information may be transmitted to a server computer and then stored in the database. In this way, a manager may evaluate how an account is being serviced.

FIGS. 5-19 illustrate various pages that may be displayed on display screens according to the invention. The pages of FIGS. 5-19 may be generated by a server computer and then transmitted over a network, such as the internet to various access computers. These pages may be used to elicit merchant account information, to assist in the underwriting process and to follow up on servicing the account. In describing the pages of FIGS. 5-19, it will be appreciated that the invention is not intended to be limited to this specific implementation that may be implemented in other ways as well.

To gain access to the server computer, the user may enter in a website address of the server computer. Typically, the initial page will be a login page having fields for entering username and password information. If authenticated, the user is taken to a home page which may list various icons that may be selected to take the user to various other pages at the website. One example of such a home page 60 that may be rendered on the user's display screen is illustrated in FIG. 5. Home page 60 is configured as a search page that permits the user to search for a certain merchant application. Home page 60 may also include various icons to permit the user to access other features of the web site. For example, page 60 may include a reports icon 61 to permit various reports to be generated, a security icon 62 to designate security settings for various users, and a point of sale provider icon 63 to identify various point of sale equipment providers for tracking purposes. Various other icons 64 may also be included to permit the user to jump to a first merchant account, to a previous merchant account, to the next merchant account and to the last merchant account. Further, icons may be provided for downloading the merchant account information on the user's computer as well as a print icon for printing the application information.

As shown in FIG. 5, a wide variety of data fields 65 are provided for entering search information. One or more of these data fields may have information input in order to search for one or more merchant applications. If a match is found, it may be displayed at the bottom of the web page as shown. When one of the listed accounts is selected, a page is rendered having the account information. An example of such a page is illustrated in FIG. 6 as described hereinafter. Examples of search fields that may be used include a merchant number, merchant name, "doing business as" name, address, quality control status, MasterCard merchant number, MasterCard code, total risk, days aging, status, product, point of sale provider, annual credit sales, business phone, federal tax identification number, sales region, sales channel, sales person identification, credit officer, credit investigator and the like.

Instead of searching for an existing merchant application, the user may select an "add new" icon 66 to add a new merchant account. When the "add new" icon is selected, the user is taken to a blank application form as illustrated in FIG. 6 where the merchant application information may be entered.

FIG. 6 illustrates a home page for entering and viewing merchant account information. Conveniently, various tabs are presented on the page and may be selected to follow the user to different pages where different categories of information may be entered. For example, as shown in FIG. 6, a merchant tab 68 has been selected to produce a merchant business information page 70. Page 70 includes various data fields 72 relating to business information on the merchant that may be entered into the application. The data fields marked with an asterisk indicate that the information is required in order to complete the application. Other quality control features may also be provided, such as by producing a notification if the entered information is incorrect or has not been entered. As shown, the business information includes a merchant number, a MasterCard merchant number, business name, business legal name, business address, business phone, customer service phone, business type, federal tax identification number, language preference, whether same day funding is requested, date business started, date contract signed, date of account initiation setup ("AIS"), date welcome package sent, date merchant processing agreement ("MPA") imaged, date of point of sale device ("POS") confirmation, email address, website address and the like.

Selection of a quality control icon 78 produces a quality control information page 80 on the user's display screen. Quality control information page 80 displays various errors that have been detected when entering in the merchant information. If an error is detected, it is flagged by marking an error box 82 on page 80. Examples of errors that may occur may include illegible writing, missing names, missing paper work, missing business name and address, missing phone or fax number, missing contact names, missing real names, missing d.b.a. names and the like. Hence, quality control information page 80 permits the user to quickly visualize whether information is missing and/or incorrect. In this way, a quality control process is in place to insure that each application contains the necessary information for underwriting.

Selection of a visitation tab 88 produces a visitation information page 90 as illustrated in FIG. 8. Page 90 includes various data fields 92 to elicit information as to whether a merchant has actually visited certain locations to obtain various information needed to process the application. For example, page 90 may include a field asking for information on what the business sells. Other fields may relate to the external facility, such as its zone, location, vicinity, seasons, building revels, building condition, where occupied by merchant, remaining floors occupied by others, advertising name display and the like. Internal facility questions may be also asked, such as condition of equipment, merchandise displays, square footage and the like. Operation environment questions may also be asked, such as the number of registers, number of employees, whether the building is leased, the refund policy and the like.

When a landlord tab 98 is selected, a landlord information page 100 is displayed as illustrated in FIG. 9. Landlord information page 100 elicits various information on the owner of the property where the merchant does business. Hence, page 100 may include questions asking whether the merchant owns the property. If not, fields 102 are provided for the landlord, the landlord's contact information and the like.

Selection of a bank references tab 108 produces a bank reference information page 110 as illustrated in FIG. 10. This page includes data fields 112 to elicit information on the bank used by the merchant. For example, the data fields may include the bank's name, contact information, account number and the like.

Shown in FIG. 11 is a supplier reference information page 120 that is produced when the supplier references tab 122 is selected. Page 120 elicits various information on suppliers of the merchant. For example, for each supplier data fields 124 may be provided for the supplier's name, supplier contact information, the supplier's products or services and the like.

Figure 12:
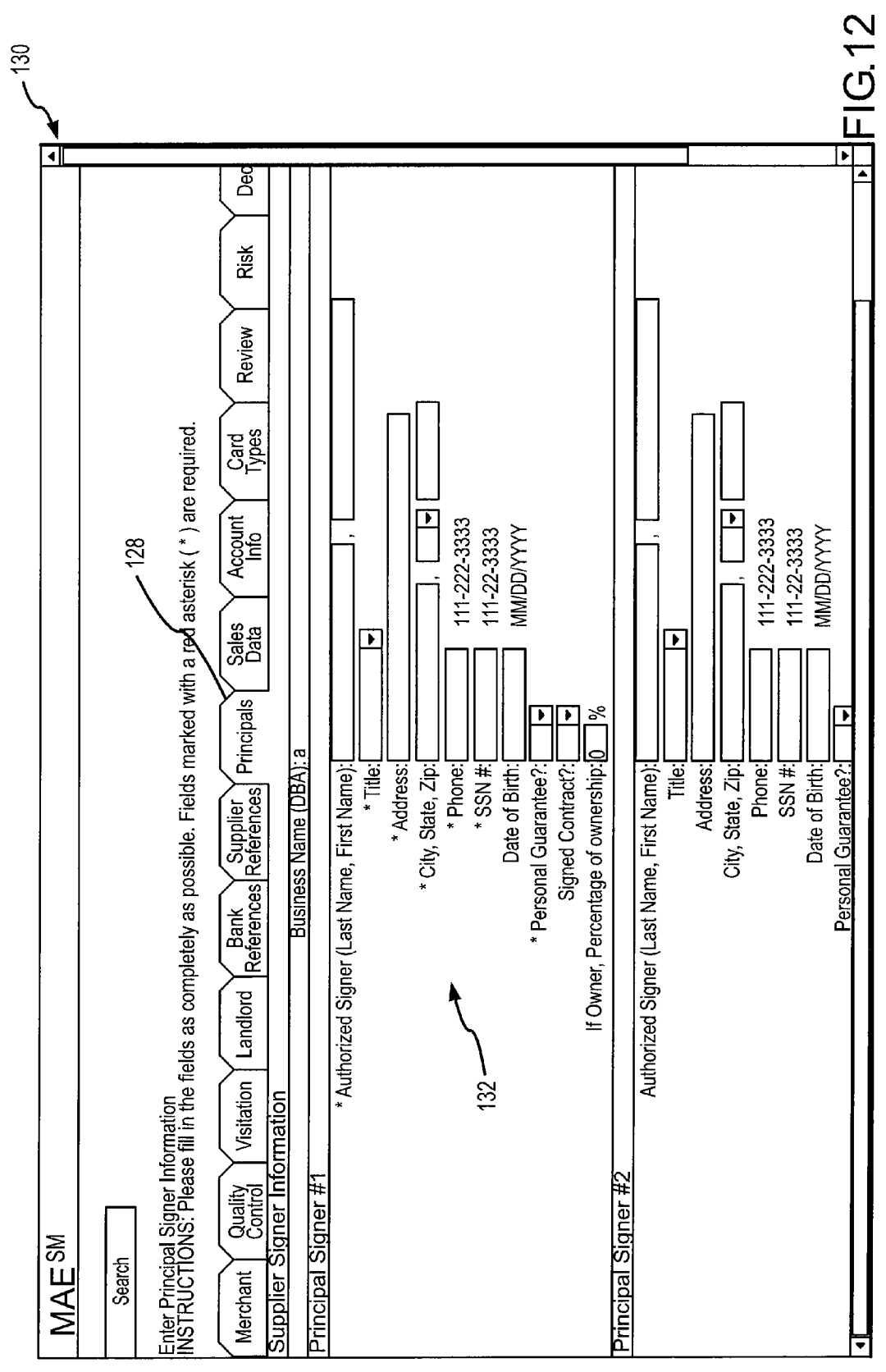

Selection of the principals icon 128 produces a principal signer information page 130 as illustrated in FIG. 12. Page 130 has data fields 132 for eliciting information on various principal signers on the merchant account. For example, page 130 may include data fields for eliciting information such as the name of the authorized signer, title, address, social security number, date of birth, whether the guarantee is a personal guarantee, whether there is a signed contract, the percentage of ownership, and the like.

FIG. 13 illustrates a sales data information page 140 that is rendered a display screen when the sales data tab 142 is selected. Sales data page 140 is employed to gather information on the nature in the amount of sales by the merchant. The sales data page 140 may include fields 144 for collecting information such as the name of the product, the MasterCard code, the total annual sales of the merchant, the total annual credit card sales of the merchant, the average credit card transaction amount, the discount rate and the like. Further, various business procedure information may be elicited, such as the breakdown of credit card payments, e.g., on the internet, mail order, telephone order, in-store and the like. Further, the timing of delivery may be elicited in terms of numbers of days.

FIG. 14 illustrates a new account information page 150 that is rendered when the account info tab 152 is selected. Page 150 is employed to gather information needed to configure the back end processing system once the account is created. Information that may be collected using data fields 154 includes the legal name, business name, business address, corporation address, risk level, phone number, contact name, federal tax identification number, sales responsibility, assessment codes, county codes, deposit type, chain code, merchant type, Electronic Merchant Deposit, ("EPC") type and cutoff and the like. Once the account is created, this information may be transmitted from the server computer to a main frame computer that handles the back end processing.

Figure 15:
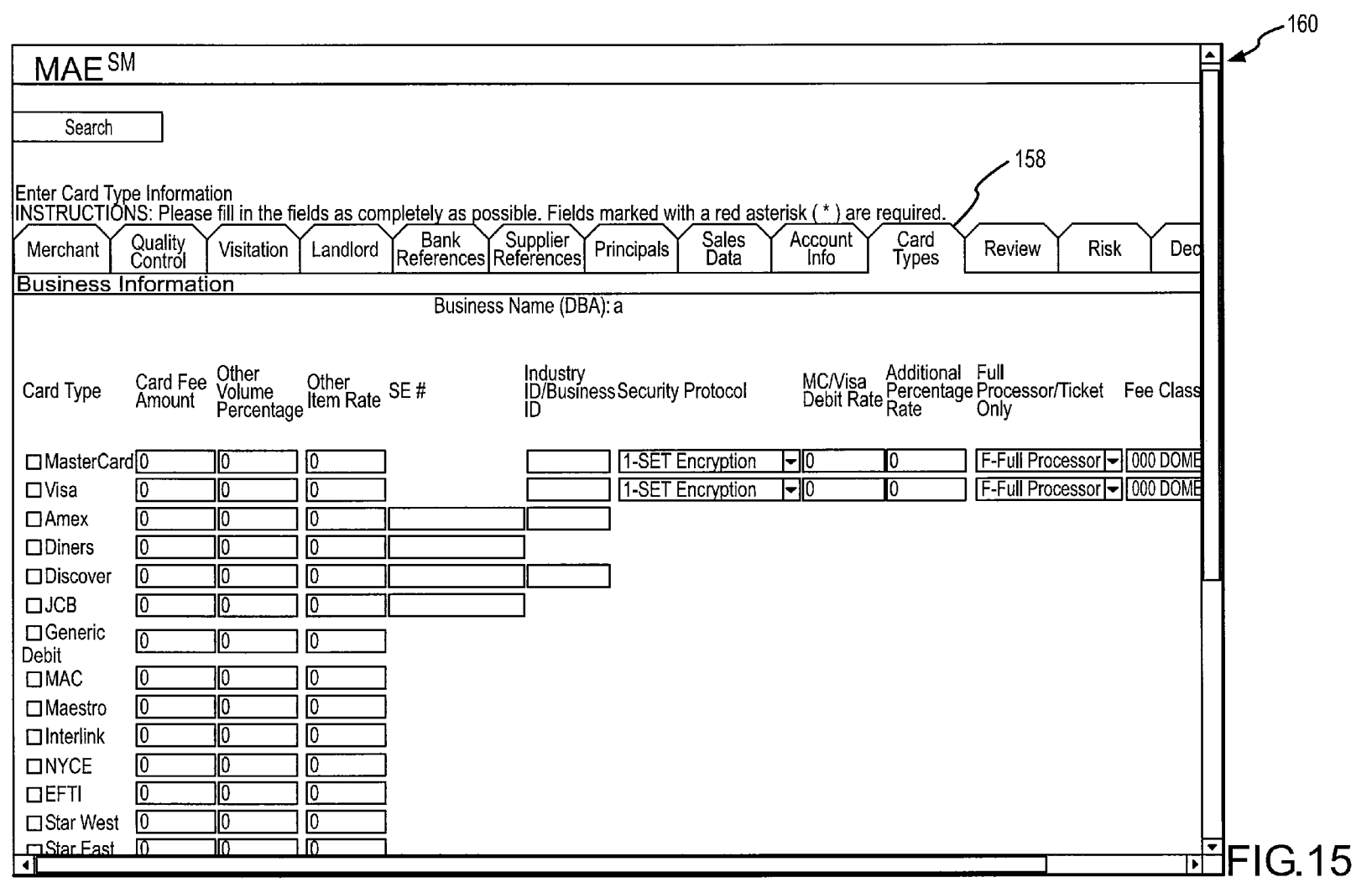

When the card types tab 158 is selected, a card type information page 160 is rendered as illustrated in FIG. 15. Page 160 elicits information on the types of credit cards that the merchant wishes to accept. With page 160, the merchant may select from a list of credit card types and enter other information such as the card fee amount, other volume percentage and the like.

Once the application information has been completed, the review tab 168 may be selected to render a review application page 170 as illustrated in FIG. 16. If any required fields have not been completed, they will be listed on page 170 along with the reason for the rejection.

Each of the fields may include a hypertext link 172 so that when selected it will take the user back to the appropriate page where the information is missing. In this way, the application may be quickly reviewed for completeness. Similarly, when a credit officer or investigator eventually investigates the application, the investigator may also access page 170 to determine if any information is missing.

Another page that is accessible by a creditor officer or investigator is a risk assessment page 180 as illustrated in FIG. 17. Page 180 is rendered when a risk icon 182 is selected. Because of the security settings, the credit investigator will have access to page 180 while a typical salesman entering application information will not. This assessment page 180 displays to the credit officer a summary of sales data as extracted from the application information. For example, page 180 may include fields 184 having a listing of the product name, total annual sales of the business, total annual credit card sales, average credit card transaction amount, discount rate and the like. Further, page 180 will display various risk data 186 that was previously calculated by the server computer and transmitted to the credit investigator's computer over the network. The risk data includes information on: credit ("CR") timeliness ("CR timeliness") that is the amount of time it takes a merchant to apply a credit to a consumer, CB ratio that is a ratio of chargebacks ("CB") by consumers to totals sales (CB/Sales), credit ratio ("CR ratio") that is a ratio of credits to total sales, NDX ("number of days") days that is the number of days from consumer charge to delivery of goods, NDX percent that is the percentage of sales that occur within the NDX days range, CB risks that are a calculated level of consumer chargeback request risk, CR risks that are a calculated level of consumer credit request risk, normal risks that are CB risk plus CR risk, NDX risks that are sales multiplied by NDX percent, other risks (such as additional risk that is manually added by an analyst), and total risks that is equal to all risks that are totaled.

Hence, using page 180, a credit investigator may quickly assess risks associated with establishing an account with a given merchant. Further, the credit investigator may vary the data in the fields to see how the credit risk calculations will vary based upon the changes. In this way, the credit investigator has latitude to determine how the risk of the merchant will vary based on various conditions, such as change in total sales, a change in the discount rate and the like.

Figure 18:
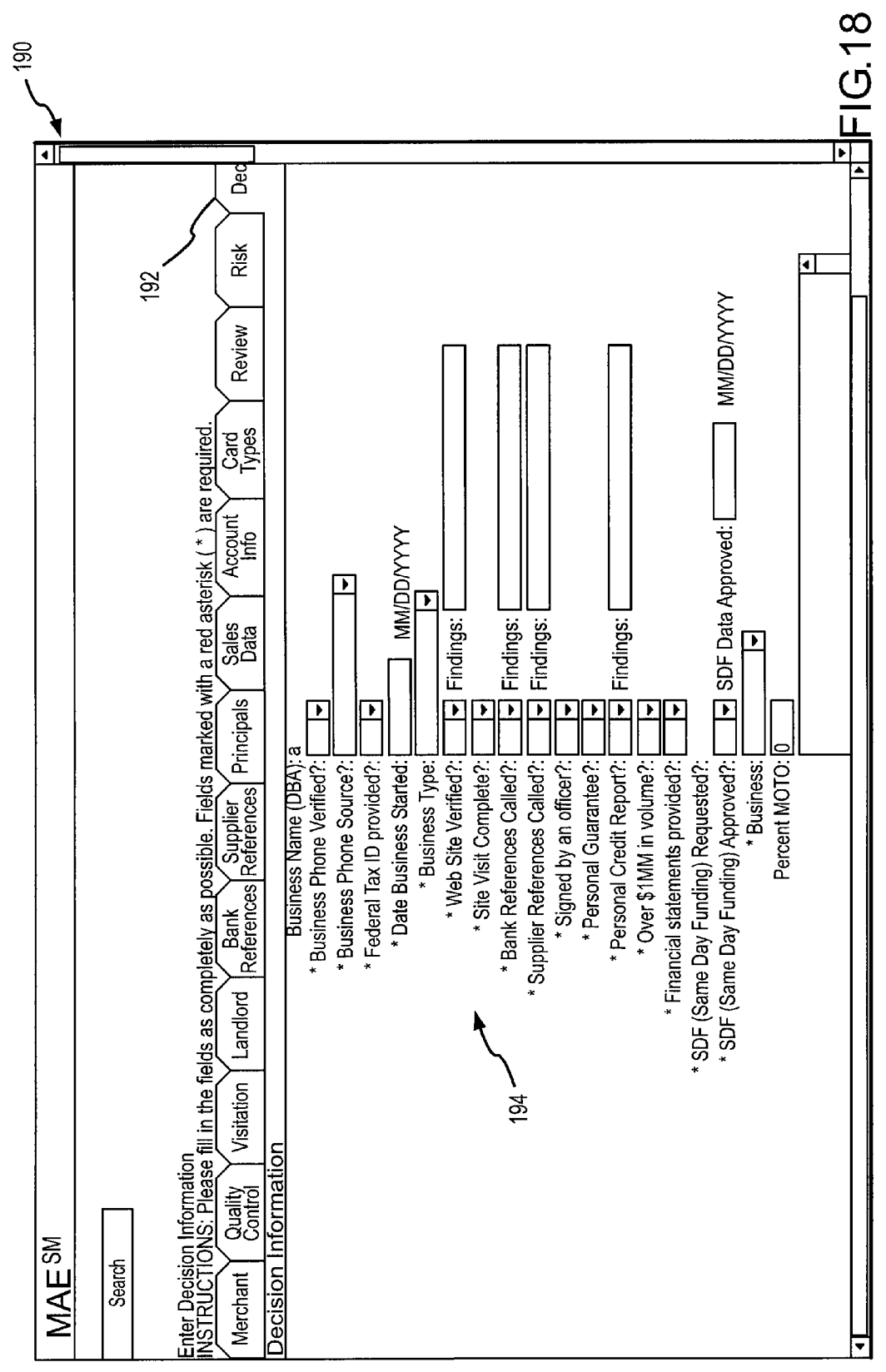

FIG. 18 illustrates a decision information page 190 that may be accessed by the credit investigator when underwriting the account using icon 192. Decision information page 190 includes various fields 194 that must be completed by the credit investigator when underwriting the account. In this way, a mechanism is in place to ensure that each account is treated similarly and that all critical information is evaluated. For example, the decision information may ask the credit investigator questions such as whether the business phone is verified, whether the federal tax identification number provided, whether the business starting date is provided, whether the business type is provided, whether the website is verified, whether the site has been visited, whether the bank references have been called, whether the supplier references have been called, whether the application was signed by an officer, whether there is a personal guarantee, whether there is a personal credit report, whether the account has over one million dollars in volume, whether financial statements were provided and the like. As an alternative, a decision tree may be provided to the credit investigator to step the investigator through the analysis. Examples of such decision trees are described in copending U.S. application Ser. No. 10/108,781, entitled "DECISION TREE SYSTEMS AND METHODS", filed on the same date as the present application and previously incorporated by reference.

Although not shown, it will be appreciated that other tabs may be provided as well so that other features may be accessed. For example, a reassign tab may be provided to reassign the application to another credit officer or investigator. This information may only accessed by a manager who may enter the name of a new credit officer or investigator. This information may be stored in a database so that historical information is provided on the credit investigators who have accessed and investigated the account.

As previously described in connection with FIG. 5, reports icon 61 may be selected to produce various reports on the account. For example, various reports, such as month to day reports and year to day reports may be provided. The names of these reports may be listed and may comprise a hypertext link that may be selected to generate the report. Examples of reports that may be included are approval rate reports, aging reports, receipt reports, pending reports, reviewed reports, approved reports, declined reports, voided reports, approved authorization sheets, approved keying sheets and the like.

When the security icon of page 62 is selected, a page may be rendered listing the names of all people authorized to access the server. Further, each individual may be classified by a user type which indicates the pages to which the person may have access. For example, the user may be a sales person, credit officer, credit investigator, sales manager, supervisor, salesperson, data entry person and the like. Certain individuals may be provided with authorization to vary the user type in order to permit different levels of access to the web pages.

The invention further provides various maintenance and tracking features to evaluate how an account is being serviced once it has been approved. For example, the user may access a page to generate welcome letters to the merchant. Conveniently, the user may enter a date range to list accounts that have been approved within the specified date range. These may then be selected to have the server computer automatically calculate a welcome letter based on information in the application. This letter is transmitted to the user's computer to be printed and mailed.

The user may also perform a search for certain accounts to see how they are being serviced. To do so, the user may utilize a search screen similar to that of FIG. 5. Once the search has been formed, a displayed account may be selected to render a tracking page 200 as illustrated in FIG. 19. Various data fields 202 are displayed for eliciting information on how the account is being serviced. For example, questions may be asked on how the account is being serviced, such as whether the merchant has received a welcome kit, the date the welcome kit was received, whether the merchant has contacted the primary bank, the date the primary bank was contacted, any reason why the bank was not contacted, whether the primary bank has spoken to the merchant, whether the primary bank has all necessary information to process the switch, the date of primary bank confirmation, any reason for not receiving a confirmation, the date of the primary bank sign off confirmation, any reason for not receiving a sign off confirmation, whether there are any general comments, and the like. These data fields may be reviewed at any time to evaluate how the account is being serviced. In this way, a system is in place to monitor service activation to increase the number of merchants that have enrolled and begin using the service. For example, the user may transmit a query to view the merchants that have reached a certain service level, e.g. all merchants that have received a welcome letter. Further, the times that each of the serving steps were performed may be visualized.

Similar to FIG. 5, a security icon may be selected to assign security levels to each of the users. When the security icon is selected, a list of the desired users may be displayed. When one of the users is selected, a security edit page may be rendered on the user's computer. The edit page may contain various data fields relating to both user information and salesperson information. For example, user ID and password information may be changed. Also, the type of user may be modified, e.g., salesperson, credit officer, supervisor, etc. Based on the type of user, different areas of the website may be accessed. For the salesperson, information on their code, region, sales channel, phone, and the like may be modified.

Reports may also be provided with the tracking feature. Such reports may include aging reports, approval rates reports, as well as reports on applications declined and voided. The aging reports may list a variety of aging categories, such as the number of days from signing until receiving the application, from receiving the application to approval, from approval to AIS, from AIS to receiving a welcome kit, from receiving the welcome kit to being contact by the primary bank, from being contacted by the primary bank to being confirmed, from being confirmed to being activated, from being signed to being activated, from being approved to being activated, from being welcomed to being activated, and the like. Further, this information may be broken down into regions, and averages may be provided for each sales region. Other filtering techniques may be used, such as by month, by sales identification numbers, buy the primary bank (POS provider), and the like.

The approval rate reports may list approval rates for various categories, such as the rate of those approved for service, declined, voided and the like. These may be broken down into various categories, such as by sales region. Also, these reports may be filtered by month, by sales ID, and the like. Other types of reports include a listing of merchant applications that have been approved, by month to date, year to date, and the like. Similar reports may be produced for those applications that were declined and voided.

The invention has now been described in detail for purposes of clarity of understanding. However, it will be appreciated that certain modifications and changes may be practiced within the scope of the appended claims.

What is claimed is:

1. A method for analyzing merchant account information, the method comprising:
   receiving at a server computer application information on merchants applying for credit service accounts;
   electronically storing the application information at a storage location;
   receiving at the server computer from a user computer information on how at least some of the accounts are being serviced;
   storing the servicing information at the storage location;
   receiving at the server computer a request from the user computer to generate a report on how at least one of the accounts is being serviced;
   generating the report at the server computer; and
   sending the report to the user computer;
   wherein the requested report comprises a report showing approval rates of the accounts.

2. A method as in claim 1, wherein the requested report comprises a report showing whether the account was activated.

3. A method as in claim 1, wherein the requested report is selected from a group of aging reports consisting a report showing the number of days from signing until receiving an application, a report showing the number of days from receiving the application to approval of the application, a report showing the number of days from approval to account setup, a report showing the number of days from account setup to receiving a welcome kit, a report showing the number of days from receiving the welcome kit to being contacted by a primary bank, a report showing the number of days from being contacted by the primary bank to being confirmed, a report showing the number of days from being confirmed to being activated, a report showing the number of days from being signed to being activated, a report showing the number of days from being approved to being activated, and a report showing the number of days from being welcomed to being activated.

4. A method as in claim 1, wherein the requested report comprises a report on applications declined and voided.

5. A method for managing how merchant accounts are being serviced, the method comprising:
   receiving at a user computer over a network a document having fields for entering information on how a merchant account is being serviced;
   entering servicing information into at least some of the fields; and
   transmitting the servicing information to a server computer over the network;
   wherein the fields are listed in a sequence according to a timeline of how servicing events are to proceed and wherein the fields elicit information selected from a group consisting of whether a merchant has received a welcome kit, the date the welcome kit was received, whether the merchant has contacted a primary bank, the date the primary bank was contacted, any reason why the bank was not contacted, whether the primary bank has spoken to the merchant, whether the primary bank has all necessary information to process a switch, the date of the primary bank confirmation, any reason for not receiving a confirmation, and general comments.

6. A method for providing information to merchants, the method comprising:
   receiving at a server computer application information on merchants applying for credit service accounts;
   electronically storing the application information at a storage location;
   receiving at the server computer from a user computer a request to identify merchants of a certain group; and
   sending a document from the server computer the user computer containing information for generating letters to the identified merchants;
   wherein the request to identify merchants of a certain group includes those merchants that need to receive a welcome letter, and wherein the document sent from the server computer contains information for generating such welcome letters.

7. A computer system for analyzing merchant account information, the system comprising:
   a server computer;
   a storage device associated with the server computer;
   wherein the server computer is configured to receive application information on merchants applying for credit service accounts, and to electronically store the application information in the storage device, and wherein the server computer is further configured to receive information on how at least some of the accounts are being serviced, and to store the servicing information at the storage location;

wherein the server computer is further configured to receive a request from a user computer to generate a report on how at least one of the accounts is being serviced, to generate the report, and to send the report to the user computer;

wherein the requested report comprises a report showing approval rates of the accounts.

8. A computer system as in claim 7, wherein the requested report comprises a report showing whether the account was activated.

9. A computer system as in claim 7, wherein the requested report is selected from a group of aging reports consisting a report showing the number of days from signing until receiving an application, a report showing the number of days from receiving the application to approval of the application, a report showing the number of days from approval to account setup, a report showing the number of days from account setup to receiving a welcome kit, a report showing the number of days from receiving the welcome kit to being contact by a primary bank, a report showing the number of days from being contacted by the primary bank to being confirmed, a report showing the number of days from being confirmed to being activated, a report showing the number of days from being signed to being activated, a report showing the number of days from being approved to being activated, and a report showing the number of days from being welcomed to being activated.

10. A computer system as in claim 7, wherein the requested report comprises a report on applications declined and voided.

* * * * *